United States Patent
Alhainen

[11] Patent Number: 5,996,658
[45] Date of Patent: Dec. 7, 1999

[54] FEED ROLLER

[75] Inventor: Paavo Alhainen, Tolosenmäki, Finland

[73] Assignee: Ponsse OYJ, Vierema, Finland

[21] Appl. No.: 09/256,768

[22] Filed: Feb. 24, 1999

[30] Foreign Application Priority Data

Feb. 24, 1998 [FI] Finland ..................................... 980421

[51] Int. Cl.⁶ .............................. B23B 31/00; B27C 1/12; A01G 23/00
[52] U.S. Cl. .................................. 144/250.17; 144/242.1; 144/248.5; 144/248.7; 144/336; 198/692.1; 198/699.1; 198/729; 198/781.3; 198/793; 226/173; 226/192
[58] Field of Search ................................. 144/4.1, 24.13, 144/335, 338, 242.1, 246.1, 248.5, 248.6, 248.7, 250.17; 198/626.1, 692, 699.1, 793, 725, 728, 729, 781.3; 226/170, 173, 192

[56] References Cited

U.S. PATENT DOCUMENTS

| | | | |
|---|---|---|---|
| 2,732,867 | 1/1956 | May et al. ............................. | 198/699.1 |
| 3,045,728 | 7/1962 | Hutchinson et al. ................ | 144/246.1 |
| 3,687,271 | 8/1972 | Lindblum ............................. | 198/692 |
| 4,766,939 | 8/1988 | Forslund ............................. | 144/250.17 |
| 5,152,328 | 10/1992 | Arvidsson ............................. | 144/248.7 |
| 5,163,489 | 11/1992 | Ketonen ............................. | 144/248.5 |
| 5,355,920 | 10/1994 | Tanquay ............................. | 144/248.5 |
| 5,739,325 | 4/1998 | Timperi ............................. | 144/250.17 |

Primary Examiner—W. Donald Bray
Attorney, Agent, or Firm—Young & Thompson

[57] ABSTRACT

The present invention relates to a feed roller (1) by means of which a felled tree (2) trunk is fed into a timber harvester for delimbing. The apparatus comprises a drive wheel (4) and at least one transmission means (5) arranged at the outer circumference of and controlled by the drive wheel, the transmission means having engagement plates (3) provided with gripping means (14). The apparatus efficiently equalizes surface pressure exerted on the tree (2) trunk, even though the drive wheel is without cushioning rubber material. The transmission means (5) arranged on the drive wheel (4) is longer than the wheel perimeter. Consequently, the transmission means is arranged to form a plane surface between the drive wheel and the tree trunk, whereby a continuous surface pressing evenly against the tree trunk is formed on the wood side in the apparatus.

14 Claims, 1 Drawing Sheet

FEED ROLLER

BACKGROUND OF THE INVENTION

The invention relates to a feed roller for guiding a tree trunk advantageously in a timber harvesting machine, the feed roller comprising a drive wheel, at least one transmission means arranged at the outer circumference of and controlled by the drive wheel, the transmission means having engagement plates provided with gripping means.

This apparatus is in general used for feeding a cut tree trunk into the timber harvester for delimbing.

In the Nordic countries, so-called feller heads are currently in general use in timber harvesting, previously these apparatuses were also known as single-grip harvesters. The apparatus has means for felling, delimbing and cutting a tree. When working with this kind of feller head, the tree is gripped and felled with felling means of the apparatus. After felling, the tree is in general delimbed by feeding the tree trunk through a ring formed by various knife-like blades, whereby the branches become detached from the trunk when hitting the blades. In order that delimbing were sufficiently efficient, the feller head must, however, get as firm a hold as possible on the surface of the trunk when it is fed towards the blades of the apparatus. On the other hand, in order to prevent wood from being damaged by means pressing the trunk, when the trunk is being fed through the feller head, the means pressing the trunk must provide an even contact surface with wood. In addition, the even contact surface must be provided for a variety of trunk diameters.

For the above reasons, various anti-skid solutions have been developed which equalize surface pressures and thus damage wood less, and adapt to the surface better. These kinds of solutions are disclosed, for instance, in Finnish Patents 55,103, 82,898, 84,445 and 97,785 and in Finnish Patent Applications 931062, 942708, 952262 and in Finnish Utility Model 1150.

In various anti-skid solutions which equalize surface pressures, separate anti-skid devices have conventionally been attached to a rubber coated wheel. Hence the anti-skid devices yield when coming into contact with a wood surface by sinking into the rubber coating of the wheel and thus equalize the pressure exerted on wood. In these apparatuses, various chains, nets or plates with optional welded gripping means, are generally used as anti-skid devices.

The currently used rubber wheels have, however, considerable drawbacks, which have not been solved so far. The rubber coating on a conventional wheel absorbs, for example, some of the feeding energy exerted on the tree trunk, and consequently more power is needed to drive the wheel. However, increased power leads to warming up of the wheel and the rubber coating thereon. Warming up is disadvantageous, since it leads to changes in the external dimensions of the wheel, which in turn causes constant inaccuracy in measuring timber which is handled with the feller head.

The warming up of the conventional rubber coated wheel also causes softening in the rubber coating, causing the mechanic anti-skid devices arranged on the wheel to sink more readily into the rubber and wear the rubber coating rapidly, which shortens the wheel's service life. Thus the conventional rubber coated wheel has to be re-coated often, which on one hand is expensive and on the other hand causes disadvantageous down-time in the use of the timber harvesting machine.

BRIEF DESCRIPTION OF THE INVENTION

The object of the present invention is to eliminate the drawbacks of the prior art and to provide quite a novel solution. The invention provides a single-wheel tree trunk feed, which efficiently equalizes the surface pressure exerted on the tree trunk and thus considerably reduces wood surface damage. With the present invention it is also possible to avoid the use of wearing rubber material in drive wheels, which clearly increases the service life of the wheel of the invention.

The object of the invention is achieved with a feed roller having the characteristics disclosed in the claims. More precisely, the apparatus in accordance with the invention is mainly characterized in that the transmission means comprises a ring-shaped means whose perimeter exceeds the outer circumference of the drive wheel, the transmission means being arranged substantially skid-free in connection with the drive wheel by means of at least one control means arranged in the drive wheel, the transmission means being arranged to form a substantially plane surface in the area between the transmission control means and the drive wheel point closest to the tree trunk to be guided in the apparatus, the transmission means thus providing a continuous surface on the side pressing against the tree trunk to be guided.

In the feed roller of the timber harvesting machine of the invention, minor constructional solutions have succeeded in improving current trunk feed considerably. The feed roller in accordance with the invention adapts quickly and flexibly to the tree trunk to be fed, having a longer grip length than previously and causing thus notably lower surface pressure on the tree trunk. Lower surface pressure in turn reduces damage caused to the wood surface and thus increases the selling value of the timber.

By mounting the control means of the feed roller of the invention with bearings so that they are substantially concentric with the drive wheel controlling the control means, it is ensured that when the apparatus is operating the control means may move in the direction of the outer circumference of the drive wheel and thus efficiently react to uneven spots on wood. However, to prevent the control means from moving excessively, their movement is limited with limiting means in the feed roller. Hence the control means is preferably arranged to move only a few degrees back and forth in its direction of rotation and thus the means is prevented from losing contact with the wood surface. In this way it can be ensured that the largest possible portion of the ring-shaped transmission means equipped with engagement plates is in constant contact with the wood surface.

Since, in the present invention, there is no need to use any rubber coating on the drive wheel when linking the engagement plates to the wheel, the life of the apparatus in accordance with the invention is clearly longer than the life of known apparatuses. The drive wheel preferably comprises transfer means arranged at the outer circumference thereof, the transfer means being arranged to engage in the ring-shaped transmission means in the immediate vicinity of the outer circumference.

One preferred embodiment of the feed roller of the invention is a drive wheel provided with a chain, the drive wheel preferably being a sprocket wheel which engages in cogs or rolls in the chain which are transverse with respect to the drive wheel direction of motion.

The control means arranged in connection with the drive wheel of the invention comprises, for instance, a flange in the drive wheel, parallel with the drive wheel's outer circumference, or a means, parallel with the drive wheel's outer circumference, arranged in connection with flanges on the opposite sides of the drive wheel. This means has a sliding surface extending outside the outer circumference of the drive wheel. The means is arranged to move easily a preselected distance in the direction of the outer circumference of the drive wheel, whereby, with the assistance of its sliding surface, the means aligns the transmission means and the engagement plates thereof accurately with the tree trunk.

If necessary, it is possible to arrange guiding rolls in the control means of the apparatus of the invention for controlling the movements of the ring-shaped transmission means rotating in the apparatus. This may be necessary, for instance, when the transmission means comprises a V-belt or some other means which slides poorly on a plane surface.

In the apparatus in accordance with the invention, the engagement plates are in general separately arranged to form an integral part of the transmission means. The transmission means being a chain, the engagement plates might be welded to the chain thus making it easy to replace a damaged engagement plate with a new one. On the other hand, a highly stress-resistant apparatus is obtained when using a transmission means, in which the engagement plates and the means constitute an integral construction produced by casting, for instance.

By arranging a protective cover outside the plane surface of the ring-shaped transmission means which is formed in the apparatus, wood waste is prevented from coming into contact with the drive wheel. Simultaneously, the work speeds up, since bark or branches from the tree trunk will not block the feed roller so easily. The protective cover also improves safety with the apparatus, as it prevents access to the rotating transmission means.

As appears from the above, considerable advantages can be achieved with the invention. In addition that the apparatus will not damage wood when handling it, the feed roller provided is also more durable and more reliable.

BRIEF DESCRIPTION OF THE DRAWINGS

In the following the invention will be described in greater detail with reference to the attached drawings, wherein.

DETAILED DESCRIPTION OF THE INVENTION

Figure 1:
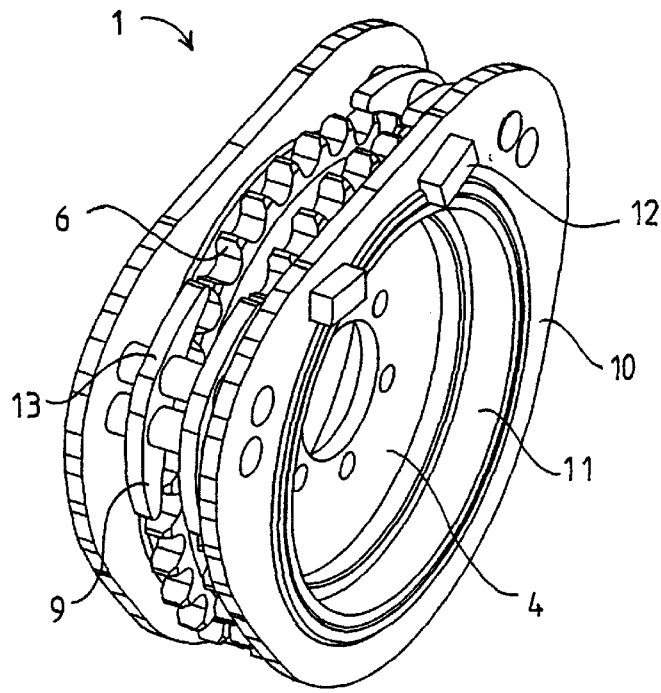
FIG. 1 is a perspective view of one feed roller in accordance with the invention seen obliquely from above.
Figure 3:
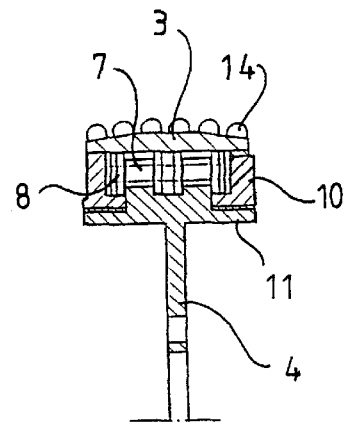
FIG. 3 is a cross section of the feed roller from point A to A in FIG. 2.
Figure 2:
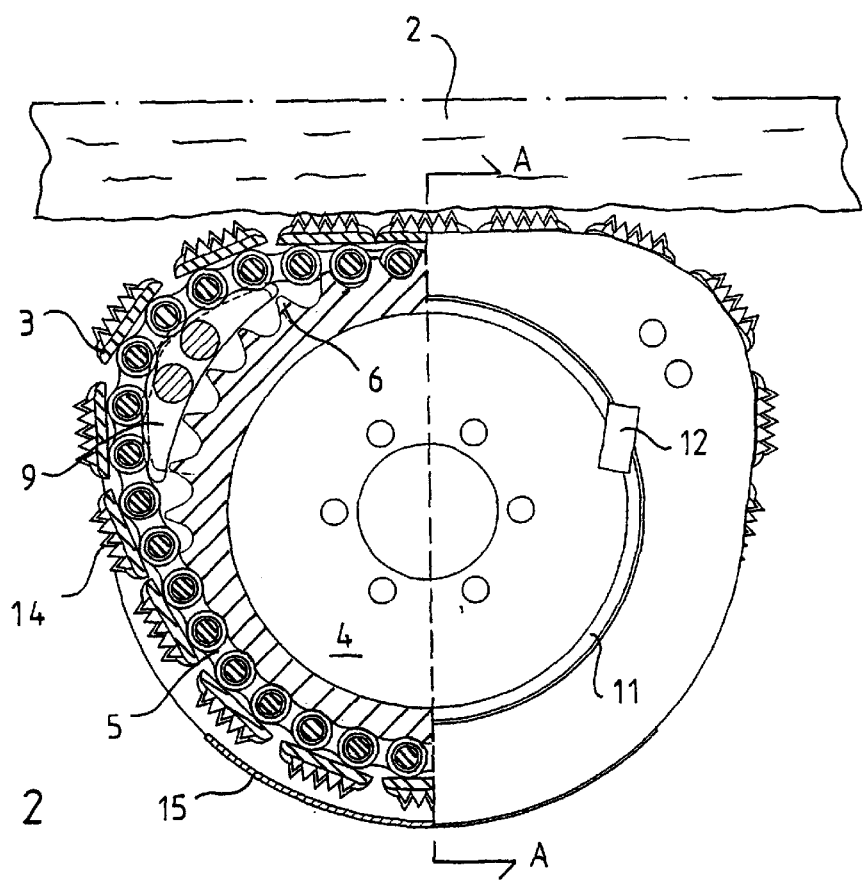
FIG. 2 is a side view of the feed roller of FIG. 1 partly cut open.

FIGS. 1 to 3 illustrate one preferred embodiment of a feed roller 1 in accordance with the invention. The feed roller comprises engagement plates 3 which press on a tree trunk 2 and feed it forward, the engagement plates being attached to at least one integral, ring-shaped transmission means 5 controlled by a drive wheel 4. The rotational motion of the drive wheel makes the transmission means provided with the engagement plates rotate in the same direction, whereby the transmission means pressing against the tree trunk, conveys said trunk. In the embodiment illustrated in the figures, the transmission means preferably comprises two adjacent roller chains or a double chain.

To control the motion of the transmission means 5, there are transfer means 6 at the outer circumference of the drive wheel 4, which engage in the transmission means and thus control its motion to be in line with the rotational motion of the drive wheel. The feed roller 1 in accordance with the invention can be readily mounted onto the drive engine axle to replace any conventional solid or rubber-coated drive wheel.

The preferred embodiment of the ring-shaped transmission means 5 thus comprises any transmission chain with interconnected links known per se. The chain comprises pins 7 that are arranged to be substantially transverse with respect to the chain's direction of motion, and the pins interconnect plates 8 in the chain links. If the pins are equipped with steel bushings, a roller chain is provided which enables rapid transfer movements. The length of the chain is selected to be a few links longer than the outer circumference of the drive wheel 4 controlling it. A chain wheel is conventionally used as the drive wheel in connection with a chain of this kind.

However, it is possible to make a feed roller 1, in which the ring-shaped transmission means 5 comprises both a toothed belt and a V-belt. The length of this kind of a belt is selected to be slightly longer than the outer circumference of the drive wheel 4 controlling it.

To control the overlong, ring-shaped transmission means 5, it is necessary to tighten it at the outer circumference of the drive wheel 4, so that the control movement can be transmitted to the transmission means. Hence, at least one control means 9, which tightens the transmission means, is arranged in connection with the drive wheel. The control means is arranged on a ring flange which moves along the drive wheel, or a flange thereon, which ring flange substantially moves in the direction of the outer circumference of the drive wheel. The ring flange comprises, for instance, frames 10 in connection with control flanges 11 on the sides of the drive wheel in accordance with FIG. 1.

The control means is thus arranged rigidly between the substantially adjacent frames outside the outer circumference of the drive wheel.

The frames 10 advantageously form in the drive wheel 4 a side wall which protects the transmission means 5. So the frame extends in the direction of the drive wheel radius outside the drive wheel and the transfer means 6 thereon and protects the transmission means against disturbing factors from outside, such as branches of the tree trunk 2 to be fed penetrating between the drive wheel and the transmission means. However, the frame is narrower on the side of the trunk to be guided with the apparatus and the engagement plates controlled in the apparatus project outside the frame for gripping the wood surface.

When the frames 10 slide along the surface of the control flanges 11, the control means 9, connected to the frames, moves at the same time substantially in parallel with the outer circumference of the drive wheel 4, the frames being concentrically linked with the drive wheel. Thus the control means all the time controls the transmission means 5 to align with the wood 2 surface. Frame movement along the control flanges can also be facilitated by arranging a separate slide bearing known per se between the flange and the frame.

In the apparatus of the invention, the ring-shaped transmission means 5 is arranged at the outer circumference of the drive wheel 4 in such a way that the control means 9 is arranged to be all the time between the transmission means and the outer circumference of the drive wheel. In addition to tightening the transmission means, a larger, continuous, plane surface, which presses against the tree trunk 2, is also achieved at the same time as appears from FIG. 2. The plane surface extends at least from the control means 5 to the point at the drive wheel circumference which is closest to the tree trunk. As a consequence, the surface of wood to be fed into the apparatus is simultaneously in contact with a plurality of engagement plates, whereby the surface pressure exerted on wood reduces and wood surface damages decrease.

In the preferred embodiment of the invention, four control means 9 are arranged in pairs in the feed roller I as appears from FIG. 1 in such a way that they are located at the outer circumference of the drive wheel 4, on the opposing sides of the point that is closest to the tree trunk 2. Hence the plane surface which guides the trunk is as large as possible extending throughout the length having the control means 9 opposite one another in accordance with FIG. 3. In addition, being arranged in pairs in the feed roller, the control means are substantially adjacent, thus making it possible to receive simultaneously two adjacent or two interconnected transmission means 5.

When the control means 9 of the feed roller 1 in accordance with the invention are arranged in connection with the frames 10 sliding along the outer circumference of the drive wheel 4, the free rotation of the control means round the drive wheel is advantageously prevented with limiting means 12 arranged in the apparatus. These means allow, however, a minor backward-and-forward motion of a few degrees in the direction of the outer circumference of the drive wheel. Thanks to this minor movement, the transmission means 5 of the feed roller is arranged to adapt very efficiently to uneven spots on the wood 2 surface and to changes in the tree trunk diameter. This movement ensures that the engagement plates 3 align accurately with the tree trunk, and thus they are prevented from penetrating into wood and the grip provided is as good as possible with the lowest possible surface pressure.

The limiting means 12 comprise, for instance, means projecting from the frame 10, which are arranged to slide in a groove of the control flange 11 or which are arranged to limit the motion of the frame when coming into contact with a machine body (not shown) in the vicinity of the feed roller 1.

The control means 9 used in the feed roller 1 of the invention are, at their simplest, means provided with mere sliding surfaces, whereby in particular the chain used as the transmission means 5 is arranged to slide either along the outer surface of the means or along a possible longitudinal groove on the outer surface. However, the surfaces of the control means can also be provided with rollers to facilitate the movements of some other transmission means, such as a V-belt.

The transmission means 5 preferably comprises engagement plates attached thereto in a separate step. When the transmission means is a chain, the engagement plates can be welded to the chain, for instance. The engagement plate and the chain link, as well as the belt used as the transmission means, can also be manufactured as one piece by casting, for instance. The engagement plate for its part is provided with conventional friction means, i.e. with gripping means 14, in order to provide a good grip between the transmission means and the wood 2 surface.

To ensure the functioning of the feed roller 1 in accordance with the invention and to improve the safety of the apparatus, a protective cover 15 is preferably arranged thereto. The protective cover shields at least part of the transmission means 5 that is unused for feeding wood 2 in the apparatus.

It is to be understood that the above specification and the drawings related thereto are only intended to illustrate the present invention. Thus the invention is not in any way restricted to the embodiment described above or disclosed in the claims, but it is obvious to the person skilled in the art that the invention can be varied and modified in a variety of ways within the scope of the inventive idea disclosed in the appended claims.

I claim:

1. A feed roller for guiding a tree trunk advantageously in a timber harvesting machine, the feed roller comprising a drive wheel, at least one transmission means arranged at the outer circumference of and controlled by the drive wheel, the transmission means having engagement plates provided with gripping means, wherein the transmission means comprises a ring-shaped means whose perimeter exceeds the outer circumference of the drive wheel, the transmission means being arranged substantially skid-free in connection with the drive wheel by means of at least one control means arranged in the drive wheel, the transmission means being arranged to form a substantially plane surface in the area between the transmission control means and the drive wheel point closest to the tree trunk to be guided in the apparatus, the transmission means thus providing a continuous surface on the side pressing against the tree trunk to be guided.

2. An apparatus as claimed in claim 1, comprising transfer means at the outer circumference of the drive wheel for engaging in the transmission means.

3. An apparatus as claimed in claim 1, comprising at least two control means on the opposing sides of the drive wheel point closest to the tree trunk to be guided in the apparatus, whereby the transmission means is arranged to form a substantially plane surface in the area between the control means, on the tree trunk side, forming a continuous surface pressing against the tree trunk to be guided.

4. An apparatus as claimed in claim 1, wherein the control means is mounted with bearings so that they are substantially concentric with the drive wheel.

5. An apparatus as claimed in claim 1, wherein the control means is arranged to be substantially rigidly fixed with a ring flange moving along the drive wheel, outside the outer circumference of the drive wheel, the ring flange being arranged to move substantially in parallel with the outer circumference of the drive wheel.

6. An apparatus as claimed in claim 5, wherein the ring flange comprises frames in connection with control flanges arranged on the sides of the drive wheel.

7. An apparatus as claimed in claim 1, wherein a receiving surface of the transmission means of the control means is substantially flat.

8. An apparatus as claimed in claim 1, wherein guiding rolls for controlling the movements of the transmission means are arranged on the receiving surface of the transmission means of the control means.

9. An apparatus as claimed in claim 1, wherein the feed roller has at least one limiting means for limiting the motion of the control means, the control means being thus arranged to move only slightly backward and forward along the outer circumference of the drive wheel.

10. An apparatus as claimed in claim 1, wherein the engagement plates are rigidly arranged to the transmission means.

11. An apparatus as claimed in claim 1, wherein the engagement plates and the transmission means constitute an integral, for instance cast, construction.

12. An apparatus as claimed in claim 1, wherein a protective cover is arranged for at least part of the transmission means in connection with the area outside the plane surface between the control means.

13. An apparatus as claimed in claim 1, wherein the transmission means is a transmission chain.

14. An apparatus as claimed in claim 1, wherein the transmission means is a roller chain.

* * * * *